United States Patent Office 3,117,992
Patented Jan. 14, 1964

3,117,992
PROCESS FOR THE PRODUCTION OF
CYCLOALIPHATIC AMINES
Raymond J. Duggan, West Seneca, N.Y., assignor to
Allied Chemical Corporation, New York, N.Y., a corporation of New York
No Drawing. Filed Sept. 12, 1960, Ser. No. 55,202
10 Claims. (Cl. 260—563)

The present invention relates to an improved process for the production of cycloaliphatic amines. More specifically the present invention resides in an improved process for the liquid phase catalytic hydrogenation of monoacylic arylamines to produce the corresponding cycloaliphatic amines.

It is known to produce cycloaliphatic amines by the liquid phase hydrogenation of arylamines, employing such hydrogenation catalysts as ruthenium, nickel, osmium, iridium and cobalt. These processes are subject to numerous significant disadvantages, for example they require superatmospheric pressures, i.e., pressures on the order of 10–400 atmospheres, thus requiring more complicated equipment with a resultant greater financial expenditure and greater difficulty in operation and maintenance. In addition the equipment attendant upon superatmospheric pressures is a constant hazard to both personnel and environment.

The above processes for the production of cycloaliphatic amines generally produce significant quantities of less desirable by-product amines such as dicycloaliphatic amines and phenylcycloaliphatic amines, for example in the hydrogenation of aniline to cyclohexylamine appreciable amounts of dicyclohexylamine and phenylcyclohexylamine are obtained.

It is therefore an object of the present invention to provide an improved process for the production of cycloaliphatic amines by the liquid phase catalytic hydrogenation of arylamines.

It is a further object of the present invention to provide a process for the production of cycloaliphatic amines by the liquid phase catalytic hydrogenation of arylamines at substantially atmospheric pressures.

A still further object of the present invention is to provide an improved process for the production of cycloaliphatic amines by the liquid phase catalytic hydrogenation of monocyclic arylamines, which process holds the formation of by-product amines to a minimum and obtains good yields of the desired product and good rates at which the desired product is formed.

It is a still further object of the present invention to accomplish the foregoing objects inexpensively and expeditiously, and further to provide a new and improved process which is suitable for utilization commercially on a continuous scale.

Further objects and advantages of the present invention will appear hereinafter.

In accordance with the present invention I have devised a process for the production of cycloaliphatic amines by the liquid phase hydrogenation of monocyclic arylamines, which process accomplishes the foregoing objects and advantages of the present invention, and which comprises: (1) passing a gas comprising hydrogen gas through a monocyclic arylamine in the presence of a hydrogenation catalyst, wherein the reaction mixture is maintained at substantially atmospheric pressure and at a temperature between below the boiling point of the arylamine starting material and at or above the boiling point of the cycloaliphatic amine product; (2) removing exit gas from the reaction mixture comprising cycloaliphatic amine product, said product being removed from the reaction mixture substantially as fast as formed; (3) condensing a crude product from the exit gas comprising cycloaliphatic amine product; and (4) recovering said cycloaliphatic amine product from the condensate.

In the process of the present invention any monocyclic arylamine may be conveniently employed, although it is preferred in the present invention to utilize aniline due to availability. Other monocyclic arylamines which may be employed include but are not limited to the following: nuclear alkyl-substituted arylamines, such as for example ortho-, meta-, or para-toluidine, ortho-, meta-, or para-xylidine, mesidine, and pseudocumidine; nuclear alkoxy-substituted arylamines such as for example ortho-, meta-, or para-anisidine, and ortho-, meta-, or para-phenetidine; nuclear aryl or arylkyl substituted arylamines such as for example benzidine, orthotolidine; 4-aminodiphenyl-methane, 4,4'-diaminodiphenylmethane, etc. The number of carbons in the above alkyl chains is not critical, although it is preferred to employ lower alkyl groups due to availability, i.e., those containing less than six carbon atoms.

Similarly the cycloaliphatic amine products are those primary cycloaliphatic amines which result from the catalytic hydrogenation of the above arylamines, with the preferred cycloaliphatic amine being cyclohexylamine. Generally yields in the order of at least 80 percent based on amount of arylamine consumed are obtained in accordance with the process of the present invention. Illustrative cycloaliphatic amines prepared by the process of the present invention and the arylamines which produce them are as follows:

Aniline→cyclohexylamine
Para-toluidine→4-methyl cyclohexylamine
Meta-toluidine→3-methyl cyclohexylamine
Ortho-toluidine→2-methyl cyclohexylamine
Para-anisidine→4-methoxy cyclohexylamine
Benzidine→4,4'-(bicyclohexyl) diamine
4-Aminodiphenylmethane→4-aminodicyclohexylmethane
4,4'-Diaminodiphenylmethane→4,4'-diaminodicyclohexylamine, etc.

Any hydrogenation catalyst can be conveniently employed in the process of the present invention, although the preferred hydrogenation catalyst for the present invention is palladium; however, other hydrogenation catalysts which may be used include the following: rhodium, nickel, osmium, cobalt, ruthenium, iridium, and platinum. The catalyst can be utilized in the elementary form either unsupported or deposited on a finely divided inert carrier, such as alumina, carbon, or kieselguhr, or as an oxide, dioxide, or as a salt. Mixtures of catalysts can also be employed. More generally the use of the catalyst in the present invention is in accordance with the teaching of the prior art on the use of hydrogenation catalysts. The metallic content of the catalyst used can of course be varied widely depending on the specific catalyst employed. Generally, the catalyst is used in an amount of from about 0.05 to about 10 percent of the arylamine by weight.

In the process of the present invention substantially pure hydrogen gas may be fed to the reaction mass at such a rate that it is completely consumed. Preferably, however, in order to realize to the fullest extent the unexpected selectivity of the conversion of monocyclic arylamine to cycloaliphatic amine, it is preferred to utilize hydrogen feed at such a rate or composition or both that unreacted gas passes through the reaction mass to aid in removing the cycloaliphatic amine product substantially as fast as formed. To this end hydrogen feed may be supplied substantially in excess of its rate of absorption in the mass, or the feed may be hydrogen diluted with inert gas such as water vapor, nitrogen, synthesis gas, etc. Synthesis gas or hydrogen diluted with nitrogen obtained from the dissociation of ammonia may be used as the hydrogenation gas.

Exit gas, which is removed from the reaction mixture, contains cycloaliphatic amine product, arylamine, and by-product amines. The exit gas will also contain unreacted hydrogen if hydrogen is used in excess, water if the hydrogen gas is saturated with water, and any other inert gas with which the hydrogen gas is diluted. The ratios of these ingredients will naturally vary depending upon the particular reactants and reaction conditions. The cycloaliphatic amine product is removed from the reaction mixture as an ingredient of the exit gas substantially as fast as formed. The removal of the product from the reaction mixture occurs rapidly due to the fact that the reaction temperature is maintained above the boiling point of the product.

The exit gas is condensed to give a crude product containing unreacted arylamine, cycloaliphatic amine product, by-product amines, and water (if the hydrogen gas is saturated with water). If the hydrogen is used in excess and/or if it is diluted with inert gas, the excess hydrogen and the inert gas passing through the reaction mixture is discharged. Surprisingly, the amount of by-product amines in the condensate is unusually low, generally less than 10 percent of the amount of cycloaliphatic amine obtained. The cycloaliphatic amine product can be recovered from the condensate in a substantially pure form by any convenient means, e.g., fractional distillation. If desired the unreacted arylamine may be recovered from the condensate and recycled.

The entire process can be easily effected as a continuous, commercial operation by charging arylamine to the reaction system approximately as fast as it is reduced and otherwise removed.

The improved yields of cycloaliphatic amine based on the amount of monocyclic arylamine consumed may be obtained when the reaction is conducted at substantially atmospheric pressures, i.e., below about 10 p.s.i.g., and over a relatively broad range of temperatures, i.e. at or above the boiling point of the cycloaliphatic amine product and below the boiling point of the arylamine starting material, for example: when cyclohexylamine is produced the temperature range will be at or above 134° C. (the boiling point of cyclohexylamine) and below 184° C. (the boiling point of aniline). The higher of the appropriate temperature limits leads to increased formation of by-products, while the lower limits give correspondingly lower reduction rates; it is therefore preferred in the present invention to utilize the lower portion of the appropriate temperature range, for example 150 to 165° C. when cyclohexylamine is prepared.

The following examples will illustrate the process of the present invention and improvements resulting therefrom. In the following examples parts and percentages are by weight.

EXAMPLE 1.—CONTINUOUS PRODUCTION OF CYCLOHEXYLAMINE

A mixture of 500 parts of aniline and 10 parts of 5 percent palladium on carbon catalyst was heated to 155° C. to 160° C. in a suitable autoclave. The pressure was adjusted to between 0 and 5 p.s.i.g. and the mass was agitated vigorously. Hydrogen saturated with water at 65° C. was passed into the mass at the rate of 17.8 to 20.4 parts per hour. The autoclave was vented to an efficient condenser from which excess hydrogen was discarded and in which crude cyclohexylamine was condensed. The latter began to distill from the reaction mass after about a half hour and was collected in a receiver. The rate of distillation increased to about 100 parts per hour after 1½ hours. When the maximum rate had been attained, fresh aniline was added at an equivalent rate to the autoclave. In this fashion, the reduction was operated in a continuous manner.

The crude product was drained from the receiver at convenient intervals. Ths crude material contained: 30 to 40 percent cyclohexylamine; 20 to 30 percent aniline; 30 to 40 percent water; and 0 to 5 percent condensation products of which dicyclohexylamine and phenylcyclohexylamine were the chief constituents.

The crude product was distilled through an efficient fractionating column to separate pure cyclohexylamine and aniline, the latter being recovered in a sufficiently pure state to be recycled directly. In this manner cyclohexylamine (B.P. 134° C.) was obtained in 80 to 85 percent of the theoretical yield based on the amount of aniline consumed. The amount of by-product amines produced amounting to only about 1.5 percent of the quantity of cyclohexylamine obtained.

EXAMPLE 2.—COMPARATIVE EXAMPLE

A mixture of 500 parts of aniline and 5 parts of a standard 5 percent palladium on charcoal catalyst was heated to 155° C. to 160° C. in a suitable autoclave. Hydrogen at the rate of 30.6 parts per hour was passed into the reaction mixture. The pressure within the autoclave was regulated at 70 p.s.i.g. by adjusting the bleed valve. The exit gas was passed through an upright condenser cooled with cold (5° C.) water so that any condensable material carried out in the exit gas was condensed and returned to the autoclave.

After a four hour period the product was analyzed and found to contain les than 5 percent cyclohexylamine, more than 95 percent of high boiling by-products and about 1 percent unchanged aniline.

The following table illustrates the production of cycloaliphatic amine utilizing varying reaction conditions. In every case the examples were conducted in a manner after Example 1, with reaction conditions as indicated.

Table I

| Example No. | Temp., Maximum, °C. | Pressure | H₂ Feed Parts/Hr. | Duration of Run, Hours | Yield of Pure Cyclohexylamine Based on Aniline Consumed, Percent |
|---|---|---|---|---|---|
| 3 | 165 | atmos. | ¹ 18.3 | 18 | 86.8 |
| 4 | 165 | atmos. | ¹ 18.3 | 27 | 86.5 |
| 5 | 165 | 10 p.s.i.g. | ¹ 18.3 | 13 | 78.3 |
| 6 | 155 | atmos. | ¹ 18.3 | 24 | 96.2 |
| 7 ² | 155 | atmos. | ¹ 18.3 | 24 | 96.5 |
| 8 | 140 | atmos. | ¹ 18.3 | 12 | 93.6 |

¹ Hydrogen saturated with water at 65° to 67° used.
² Highly purified aniline used.

The following table illustrates the production of cycloaliphatic amine utilizing "dry" hydrogen gas, varying catalysts and varying reaction conditions. In every case the examples were conducted in a manner after Example 1, except as indicated.

Table II

| Example No. | Catalyst | Amount of Catalyst, Percent | Temperature, Maximum, °C. | Pressure | Duration of run, Hours | Yield of Pure Cyclohexylamine Based On Aniline Consumed, Percent |
|---|---|---|---|---|---|---|
| 9 | 30% cobalt on blown silica. | 4 | 155–160 | atmos. | 21 | 85 |
| 10 | Raney nickel | 4 | 100 | atmos. | 40 | 88 |
| 11 | 5% rhodium on alumina. | 2 | 160 | atmos. | 4 | 95 |

This present invention may be embodied in other forms or carried out in other ways without departing from the spirit or essential characteristics thereof. The present embodiment is therefore to be considered as in all respects illustrative and not restrictive, the scope of the invention being indicated by the appended claims and all changes which come within the meaning and range of equivalency are intended to be embraced therein.

I claim:

1. A process for the preparation of a primary cycloaliphatic amine by the hydrogenation of a monocyclic arylamine which comprises: (1) passing a gas comprising hydrogen gas through a monocyclic arylamine in the presence of a hydrogenation catalyst, wherein the reaction mixture is maintained at substantially atmospheric pressure and at a temperature between the boiling point of the cycloaliphatic amine product and below the boiling point of the arylamine starting material; (2) removing exit gas from the reaction mixture comprising cycloaliphatic amine product, said product being removed from the reaction mixture substantially as fast as formed; (3) condensing a crude product from the exit gas comprising cycloaliphatic amine product; and (4) recovering said cycloaliphatic amine product from the condensate.

2. A process according to claim 1 wherein said arylamine is aniline and wherein said cycloaliphatic amine is cyclohexylamine.

3. A process according to claim 2 wherein said hydrogen is used in excess.

4. A process according to claim 2 wherein said hydrogen is saturated with an inert gas.

5. A process according to claim 4 wherein said inert gas is water vapor.

6. A process according to claim 2 wherein arylamine is distilled from the condensate and recycled.

7. A process according to claim 2 wherein said hydrogenation catalyst is palladium.

8. A process according to claim 2 wherein said hydrogenation catalyst is cobalt.

9. A process according to claim 2 wherein said hydrogenation catalyst is nickel.

10. A process according to claim 2 wherein the process is run continuously by adding arylamine to the reaction mixture at approximately the rate at which it is removed from the reaction mixture.

References Cited in the file of this patent

UNITED STATES PATENTS

| | | |
|---|---|---|
| 2,822,392 | Illich et al. | Feb. 4, 1958 |
| 2,955,926 | Illich et al. | Oct. 11, 1960 |

OTHER REFERENCES

Yamazakai et al.: C. A., volume 44, page 1534 (1950).

Debus et al.: Bull. Soc. Chim. Belges, vol. 62, pp. 172–198 (1953).